(12) United States Patent
Natsume

(10) Patent No.: US 9,835,936 B2
(45) Date of Patent: Dec. 5, 2017

(54) ANGLE ADJUSTMENT APPARATUS AND PROJECTION DISPLAY APPARATUS

(71) Applicant: CANON KABUSHIKI KAISHA, Tokyo (JP)

(72) Inventor: Noriyuki Natsume, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/208,667

(22) Filed: Jul. 13, 2016

(65) Prior Publication Data

US 2017/0017141 A1 Jan. 19, 2017

(30) Foreign Application Priority Data

Jul. 16, 2015 (JP) ................................ 2015-141792

(51) Int. Cl.
| | |
|---|---|
| *G03B 21/14* | (2006.01) |
| *G02B 7/00* | (2006.01) |
| *G03B 21/00* | (2006.01) |
| *G03B 33/12* | (2006.01) |
| *G02B 27/09* | (2006.01) |
| *G02B 27/10* | (2006.01) |

(52) U.S. Cl.
CPC ............ *G03B 21/142* (2013.01); *G02B 7/00* (2013.01); *G02B 7/005* (2013.01); *G03B 21/006* (2013.01); *G03B 21/145* (2013.01); *G03B 33/12* (2013.01); *G02B 27/0961* (2013.01); *G02B 27/1026* (2013.01)

(58) Field of Classification Search
CPC .. G03B 21/14; G03B 21/145; G03B 21/2046; G03B 21/2066; G03B 21/2073; G02B 7/00; G02B 7/023; G02B 7/18; G02B 7/1822; G02B 7/1824
See application file for complete search history.

(56) References Cited

U.S. PATENT DOCUMENTS

| 5,557,327 A | 9/1996 | Hasegawa et al. |
| 6,705,732 B2 * | 3/2004 | Tsao ..................... G03B 21/145 349/58 |

(Continued)

FOREIGN PATENT DOCUMENTS

| JP | 63019807 U | 2/1988 |
| JP | 6391817 U | 6/1988 |

(Continued)

*Primary Examiner* — William C Dowling
(74) *Attorney, Agent, or Firm* — Rossi, Kimms & McDowell LLP

(57) ABSTRACT

An angle adjustment apparatus includes a holder including a first surface, a base member that includes a second surface, and a driver driving the holder. At least one surface of the first and second surfaces includes a curved shape. The first surface slides around a plurality of axes passing through a center of curvature of the curved shape to the second surface according to a position where the driving force is applied to the holder. Sliding the first surface on the second surface allows the holder to tilt to the base member. The driver applies driving force to a surface of the holder perpendicular to a first direction when driving the holder in the first direction, and applies driving force to a surface of the holder perpendicular to a second direction orthogonal to the first direction when driving the holder in the second direction.

19 Claims, 13 Drawing Sheets

(56) References Cited

U.S. PATENT DOCUMENTS

| | | |
|---|---|---|
| 7,345,724 B2 | 3/2008 | Yoshimura et al. |
| 8,210,692 B2 * | 7/2012 | Yoshimura ............... G02B 5/10 353/98 |
| 2004/0119952 A1 * | 6/2004 | Chen .................... G03B 21/001 353/119 |
| 2004/0263790 A1 * | 12/2004 | VanOverloop ......... H04N 9/317 353/31 |
| 2007/0247597 A1 * | 10/2007 | Lin ........................ G03B 21/28 353/98 |
| 2013/0016322 A1 * | 1/2013 | Wakabayashi ....... G03B 21/145 353/20 |
| 2016/0062218 A1 * | 3/2016 | Shen ...................... G02B 7/003 353/98 |
| 2016/0131966 A1 * | 5/2016 | Matsuyama ......... G03B 21/208 353/85 |

FOREIGN PATENT DOCUMENTS

| | | |
|---|---|---|
| JP | 07236086 A | 9/1995 |
| JP | 11202408 A | 7/1999 |
| JP | 2006039087 A | 2/2006 |

* cited by examiner

ANGLE ADJUSTMENT APPARATUS AND PROJECTION DISPLAY APPARATUS

BACKGROUND OF THE INVENTION

Field of the Invention

The present invention relates to an angle adjustment apparatus of an optical member, and more particularly, to an angle adjustment apparatus used for an image display apparatus.

Description of the Related Art

A projector having liquid crystal panels respectively corresponding to each light of three primary colors (R, G and B) adjusts an angle of an optical functional member (optical member) disposed between each of the liquid crystal panels of the three primary colors and a composite prism to improve optical performance. For example, Japanese Patent Laid-Open No. ("JP") 2006-39087 adjusts an angle of a phase difference compensation plate disposed between a liquid crystal panel and a composite prism to improve contrast. Additionally, Japanese Patent Laid-Open No. ("JP") 11-202408 discloses a method tilting a transparent plate-like member disposed between a liquid crystal panel and a composite prism to perform registration adjustment of less than one pixel.

Disposing an angle adjustment mechanism of the optical functional member between the liquid crystal panel and the composite prism requires a space corresponding to a range of movement of the mechanism in addition to a space that the mechanism occupies. Thus, widening a distance between the liquid crystal panel and the composite prism is required to be provided with the angle adjustment mechanism.

In a projection display apparatus (projector), widening the distance between the liquid crystal and the composite prism increases a backfocus of a projection lens, and thus enlargers the projection lens. Accordingly, the angle adjustment mechanism is preferably a small size.

JP2006-39087 performs angle adjustment around one axis regarding a tilt around an axis perpendicular to an optical axis. JP11-202408 also performs angle adjustment by a tilt around one axis. For example, in the angle adjustment according to JP11-202408, an elastic member urges an optical functional member, and thus a tilting fulcrum of the transparent plate-like member is not determined to one. Moreover, in a configuration where the transparent plate-like member is tiltable around orthogonal two axes, tilting the transparent plate-like member around one axis can tilt the transparent plate-like member around the other axis (hereinafter, this phenomenon is referred to as "crosstalk"). Further, the transparent plate-like member can rotate around an axis parallel to an optical axis (hereinafter, rotating the transparent plate-like member around the optical axis is referred to as "rotation").

Thus, for example, adjusting contrast of a phase difference compensation plate using the angle adjustment mechanism may decrease a peak value of contrast due to "rotation". In addition, for example, performing registration adjustment using a wavelength plate may reduce contrast due to an unintended rotation of the wavelength plate.

SUMMARY OF THE INVENTION

The present invention provides an angle adjustment apparatus having a small and simple configuration and capable of accurately adjusting an angle of an optical functional member, and an image display apparatus using such an angle adjustment apparatus.

An angle adjustment apparatus according to one aspect of the present invention adjusts an angle of an optical member. The angle adjustment apparatus includes a holder that has a first surface and holds the optical member, a base member that has a second surface coming into contact with the first surface and supports the holder, an urging member that urges the holder to the base member, and a driver that applies driving force to the holder. At least one surface of the first and second surfaces includes a curved shape. The first surface is slidable around a plurality of axes passing through a center of curvature of the curved shape with respect to the second surface according to a position where the driving force is applied to the holder. Sliding the first surface on the second surface allows the holder to tilt relative to the base member. The driver applies driving force to a surface of the holder perpendicular to a first direction when driving the holder in the first direction, and applies driving force to a surface of the holder perpendicular to a second direction orthogonal to the first direction when driving the holder in the second direction.

A production method of an image display apparatus including an image display element and a illumination optical system that has an optical member and guide light from a light source to the image display element according to another aspect of the present invention includes a step of attaching the optical member to an angle adjustment apparatus that adjusts an angle of the optical member, and a step of adjusting an angle of the attached optical member using the angle optical apparatus. The angle adjustment apparatus includes a holder that has a first surface and holds the optical member, a base member that has a second surface coming into contact with the first surface and supports the holder, an urging member that urges the holder to the base member, and a driver that applies driving force to the holder. At least one surface of the first and second surfaces includes a curved shape. The first surface is slidable around a plurality of axes passing through a center of curvature of the curved shape with respect to the second surface according to a position where the driving force is applied to the holder. Sliding the first surface on the second surface allows the holder to tilt relative to the base member. The driver applies driving force to a surface of the holder perpendicular to a first direction when driving the holder in the first direction, and applies driving force to a surface of the holder perpendicular to a second direction orthogonal to the first direction when driving the holder in the second direction.

An image display apparatus according to another aspect of the present invention includes a liquid crystal panel that modulates light from a light source, an optical system that guides light from the light source to the liquid crystal panel, an optical member that is arranged between the liquid crystal panel and the optical system, and an angle adjuster that adjusts an angle of the optical member. The angle adjuster has a holder that includes a first surface and holds the optical member, a base member that includes a second surface coming into contact with the first surface and supports the holder, an urging member that urges the holder to the base member, and a driver that applies driving force to the holder. At least one surface of the first and second surfaces includes a curved shape. The first surface is slidable around a plurality of axes passing through a center of curvature of the curved shape with respect to the second surface according to a position where the driving force is applied to the holder. Sliding the first surface on the second surface allows the holder to tilt relative to the base member. The driver applies driving force to a surface of the holder perpendicular to a first direction when driving the holder in the first direction, and applies driving force to a surface of the holder perpendicular to a second direction orthogonal to the first direction when driving the holder in the second direction.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

First Embodiment

Figure 1A:
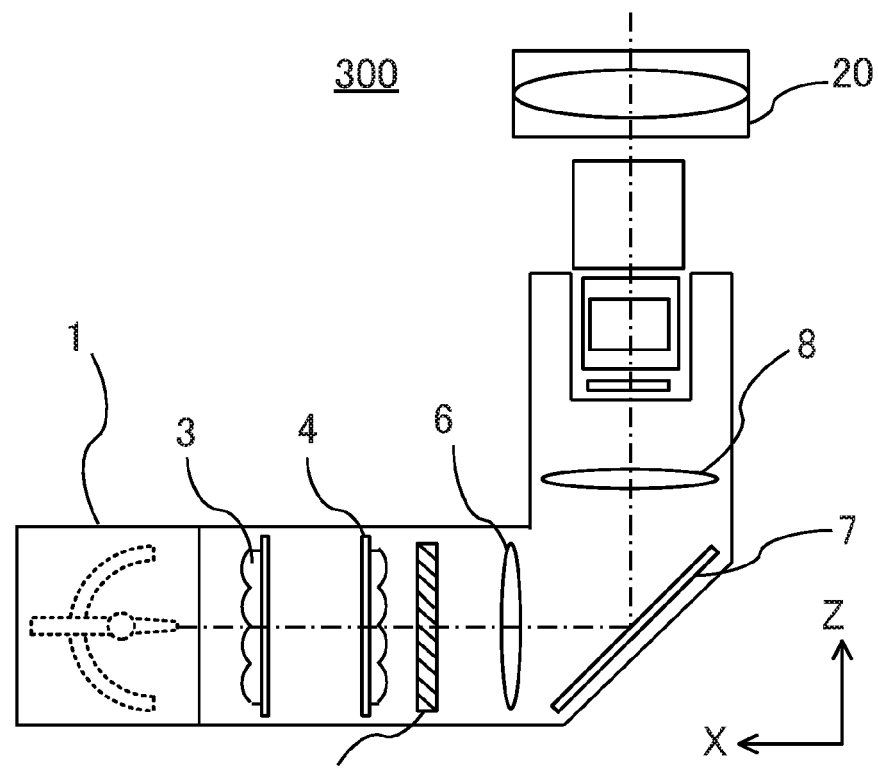
FIGS. 1A and 1B are schematic plan views of a projection display apparatus according to first to fourth embodiments of the present invention.
Figure 1B:
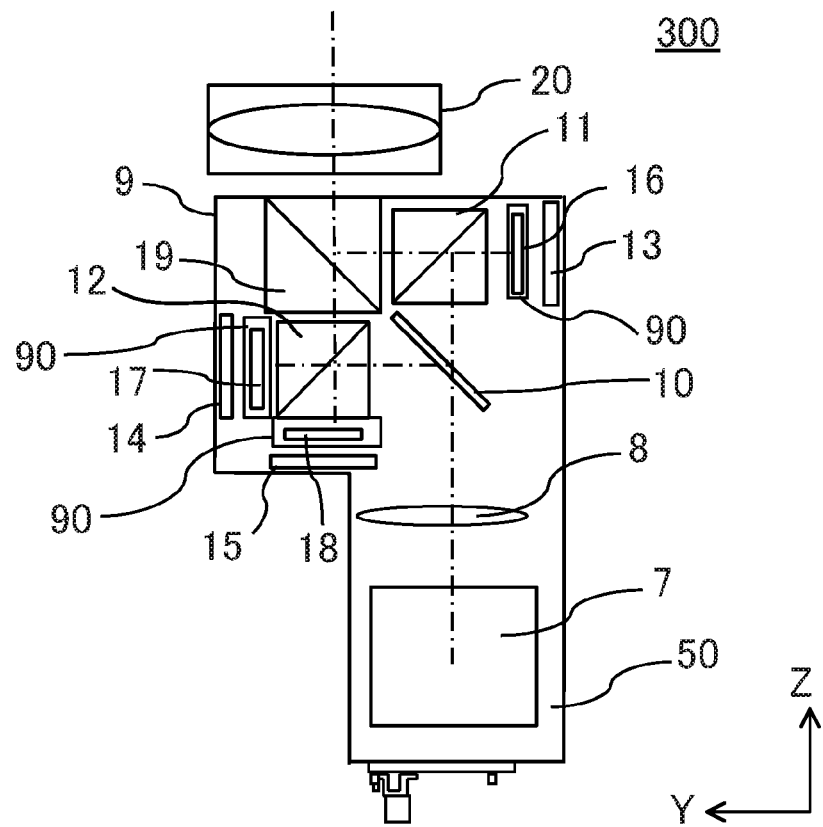

FIGS. 1A and 1B are sectional views, which are respectively viewed from directions orthogonal to each other, of a projection display apparatus 300 according to each embodiment of the present invention.

Reference numeral 50 denotes a housing (optical base) of the projection display apparatus 300. Reference numeral 1 a light source such as an ultrahigh pressure mercury lamp emitting white light as a continuous spectrum. Reference numerals 3 to 8 constitute an illumination optical system guiding light to a reflection liquid crystal panel (image display element) as described below.

Reference numeral 3 denotes a first fly eye lens where rectangular lenses are arranged in a matrix form, and a second fly eye lens having lenses respectively corresponding to each lens of the first fly eye lens 3. Reference numeral 5 denotes a polarization conversion element that converts unpolarized light into light having a predetermined polarization direction. Reference numeral 6 denotes a first condenser lens. Reference numeral 7 denotes a reflection mirror substantially orthogonally bending a light flux from the first condenser lens 6. Reference numeral 8 denotes a second condenser lens.

Reference numeral 10 denotes a dichroic mirror that reflects R (red) light and B (blue) light and transmits G (green) light. Reference numeral 11 denotes a polarization beam splitter for G light that transmits P polarization and reflects S polarization. Reference numeral 12 denotes a poralization beam splitter for R light and B light that reflects R light being S polarization and transmits B light converted into P polarization to perform color separation. Reference numerals 13 to 15 respectively denote reflection liquid crystal panels for G light, R light and B light, and they modulates light from the light source 1 guided by the polarization beam splitters 11 and 12 to form a desirable image.

Reference numerals 16 to 18 respectively denote optical functional members for red light, green light and blue light. Reference numeral 90 denotes an angle adjustment apparatus that adjusts each angle of the optical functional members (optical members) 16 to 18. As the optical functional member, any one of a phase difference compensation film, a glass plate having an antireflection film, a polarization plate, a phase difference plate and a glass plate having a dichroic film can be used.

A specific configuration will be described below. Reference numeral 19 denotes a polarization beam splitter for composition to composite R, G and B light. A dichroic mirror or a dichroic prism can be used instead of the polarization beam splitter for composition 19. Reference numeral 20 denotes a projection lens that enlarges and projects light composed by the polarization beam splitter for composition 19 onto a projection surface such as a screen (not illustrated).

In other words, the projection display apparatus 300 separates light emitted from the light source 1 to be guided to the reflection liquid crystal panel 13 to 15, and projects light reflected by each reflection liquid crystal panel onto the projection surface using the projection lens 20.

In this embodiment, the angle adjustment mechanism (angle adjustment apparatuses) 90 is arranged in three optical paths of R, G and B light, but may arranged in any two optical paths or only one optical path. When the adjustment mechanism is arranged in two optical paths, since arranging the angle adjustment mechanism in adjacent optical paths of R and B light is largely restricted by a space, it is preferable that the angle adjustment mechanism is arranged in either of optical paths of R light and B light and the optical path of G light.

Hereinafter, a specific configuration of the angle adjustment mechanism 90 will be explained referring to FIGS. 2A to 6.

Figure 2A:
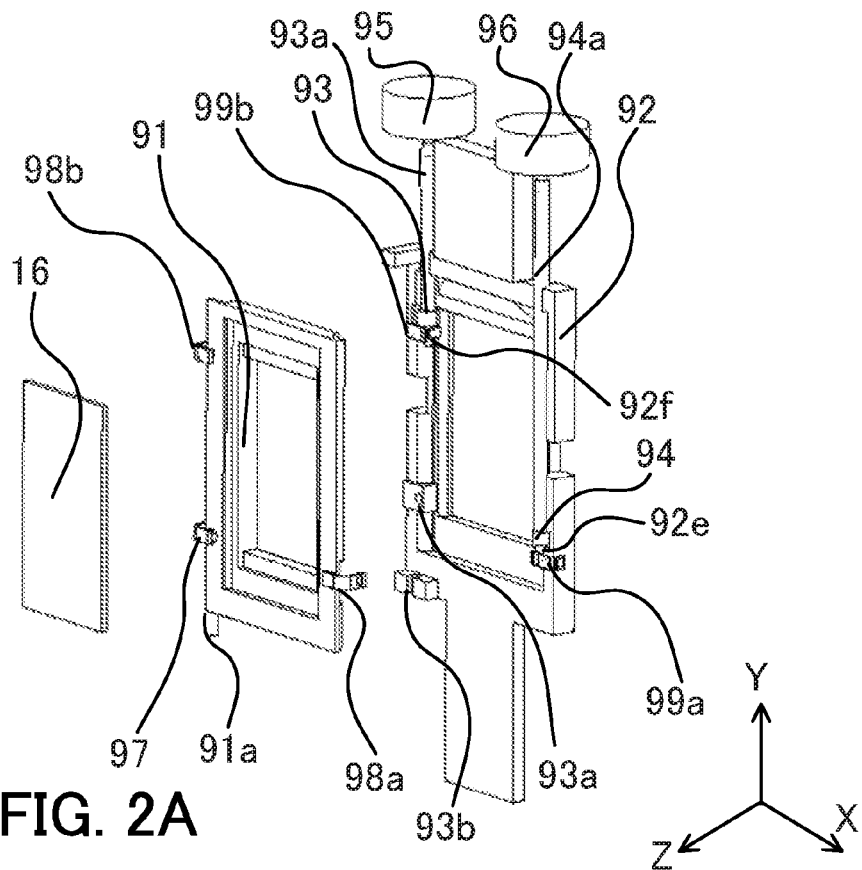
FIGS. 2A and 2B are exploded perspective views of an angle adjustment mechanism according to the first embodiment.
Figure 2B:
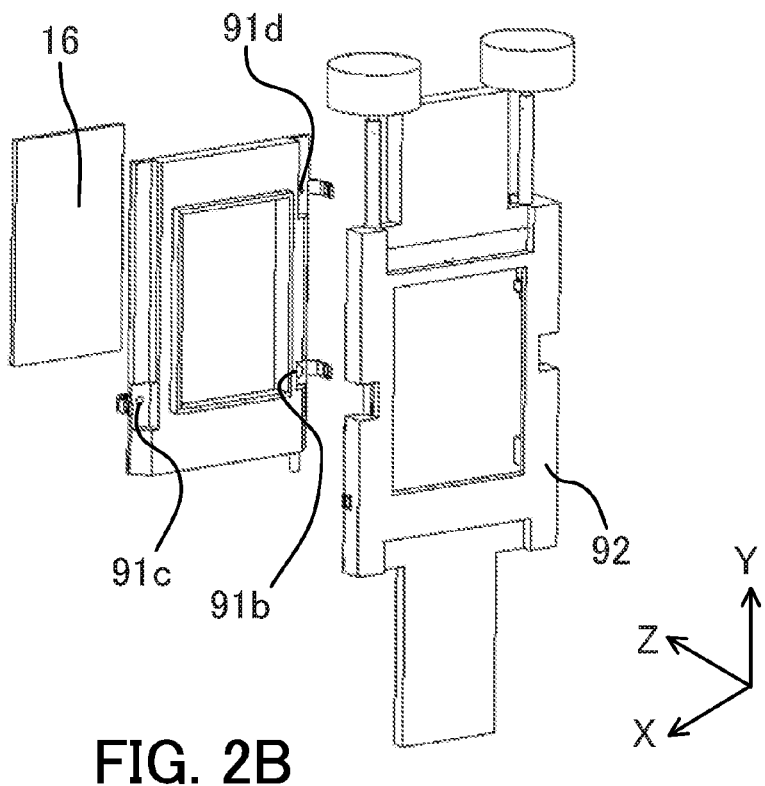

FIGS. 2A and 2B are exploded perspective views of the angle adjustment mechanism 90. Reference numeral 92 denotes a fixing member (base member) that is fixed by the optical base 50 in the projector, 91 a tilting member (holder)

that holds the optical functional member 16 and comes in contact with the fixing member 92.

The fixing member 92 includes two cylindrical cams (displacement transmitters) 93 and 94 that displace the tilting member 91 in the Z-axis direction. The cylindrical cams 93 and 94 respectively include shaft parts 93a and 94a that are rotatable axis decentered from a central axis of a sectional view.

The tilting member 91 includes a spring property member 97 that urges the tilting member 91 to the fixing member 92 and a spring property members 98a and 98b that each urge the tilting member 91 to the cylindrical cams 94 and 93. Additionally, the fixing member 92 includes a spring property member 99a and 99b that each urge the cylindrical cams 94 and 93 to the fixing member 92.

An actuator 95 transmits driving force to the cylindrical cam 93 through the shaft part 93a. Moreover, an actuator 96 transmits driving force to the cylindrical cam 94 through the shaft part 94a. These actuators 95 and 96 each include a motor and at least one gear including a worm gear, which are not illustrated.

Figure 3:
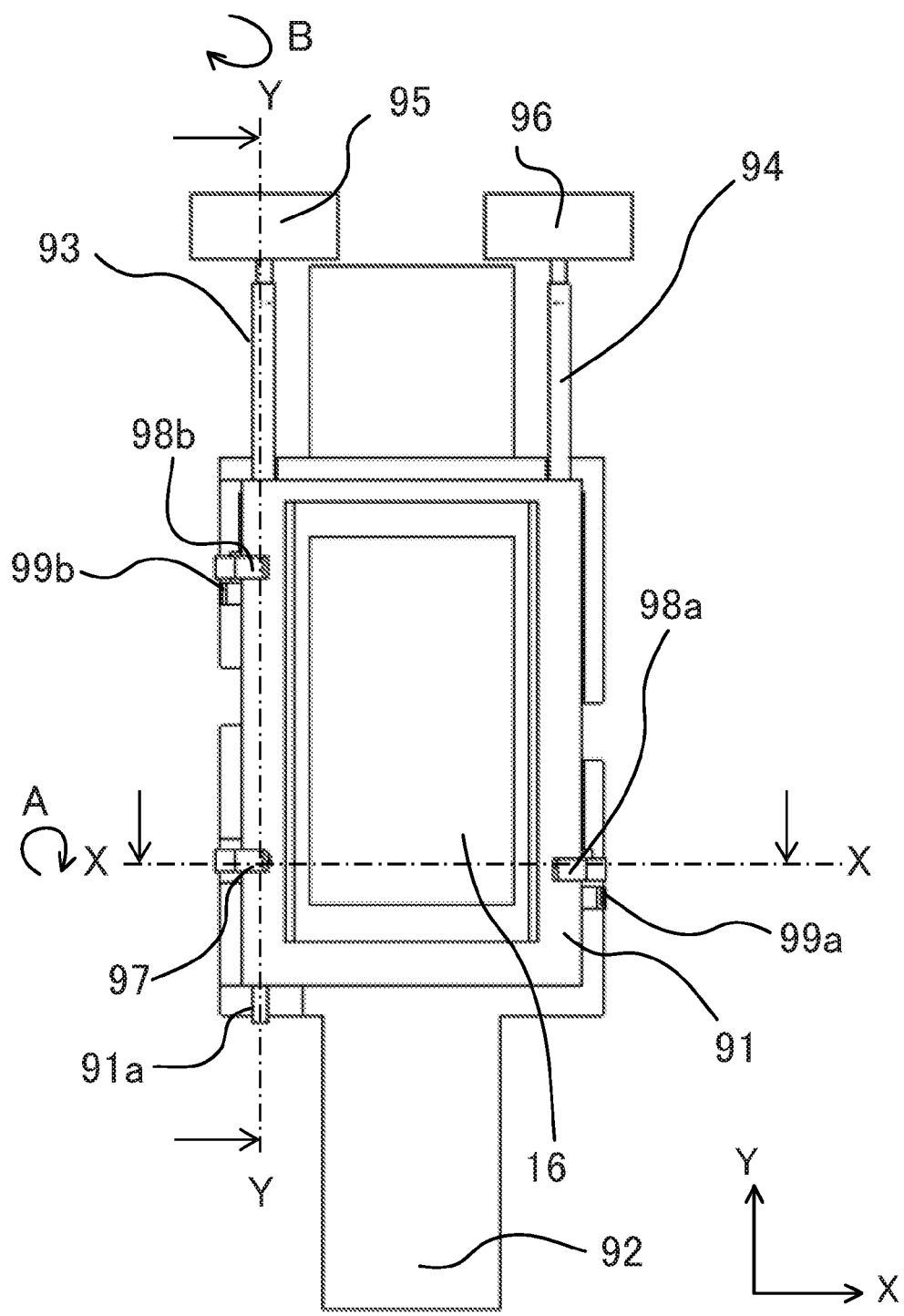
FIG. 3 is a plan view of the angle adjustment mechanism according to the first embodiment.
Figure 5:
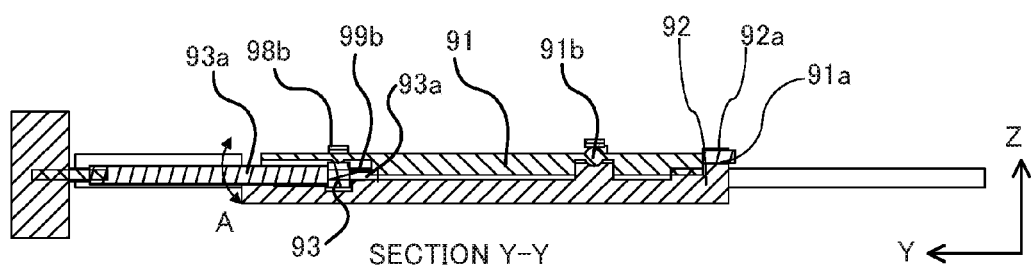
FIG. 5 is a Y-Y line sectional view of the angle adjustment mechanism according to the first embodiment.
Figure 6:
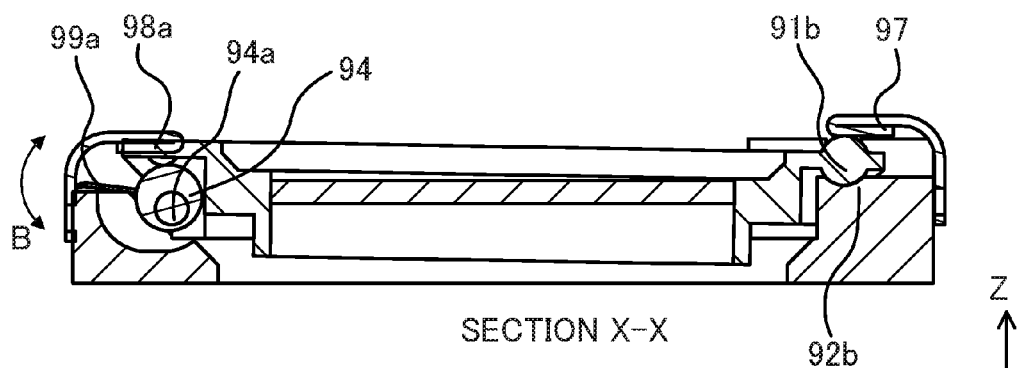
FIG. 6 is a X-X line sectional view of the angle adjustment mechanism according to the first embodiment.

FIG. 5 is a Y-Y line sectional view of FIG. 3 viewed along the X-axis direction, and FIG. 6 is a X-X line sectional view of FIG. 3 viewed along the −Y-axis direction. As illustrated in FIG. 6, the tilting member 91 is provided with a convex spherical surface 91b, and the fixing member 92 is provided with a concave spherical surface (curved shape) 92b that contacts with the convex spherical surface 91b. The spring property member 97 urges the tilting member 91 to the fixing member 92 so that the convex spherical surface 91b slidably contacts with the concave spherical surface 92b. As illustrated in FIG. 5, the tilting member 91 is provided with a cylindrical shaft 91a, and a central shaft of the cylindrical shaft 91a is a shaft in the Y-axis direction that passes through a center (center of curvature) of the convex spherical surface 91b. The cylindrical shaft 91a is inserted into a U-groove 92a formed on the fixing member 92.

The tilting member 91 abuts against the cylindrical cam 93 by urging force of the spring property member 98b. The shaft part 93a of the cylindrical cam 93 abuts against a V-groove 92f formed on the fixing member 92 by urging force of the spring property member 99b. Thereby, the fixing member 92 rotatably supports the cylindrical cam 93 around the Y-axis. The shaft part 94a of the cylindrical cam 94 abuts against a V-groove 92e by urging force of the spring property member 99a, and thus the fixing member 92 also rotatably supports the cylindrical cam 94 around the Y-axis as with the cylindrical cam 93.

Figure 4:
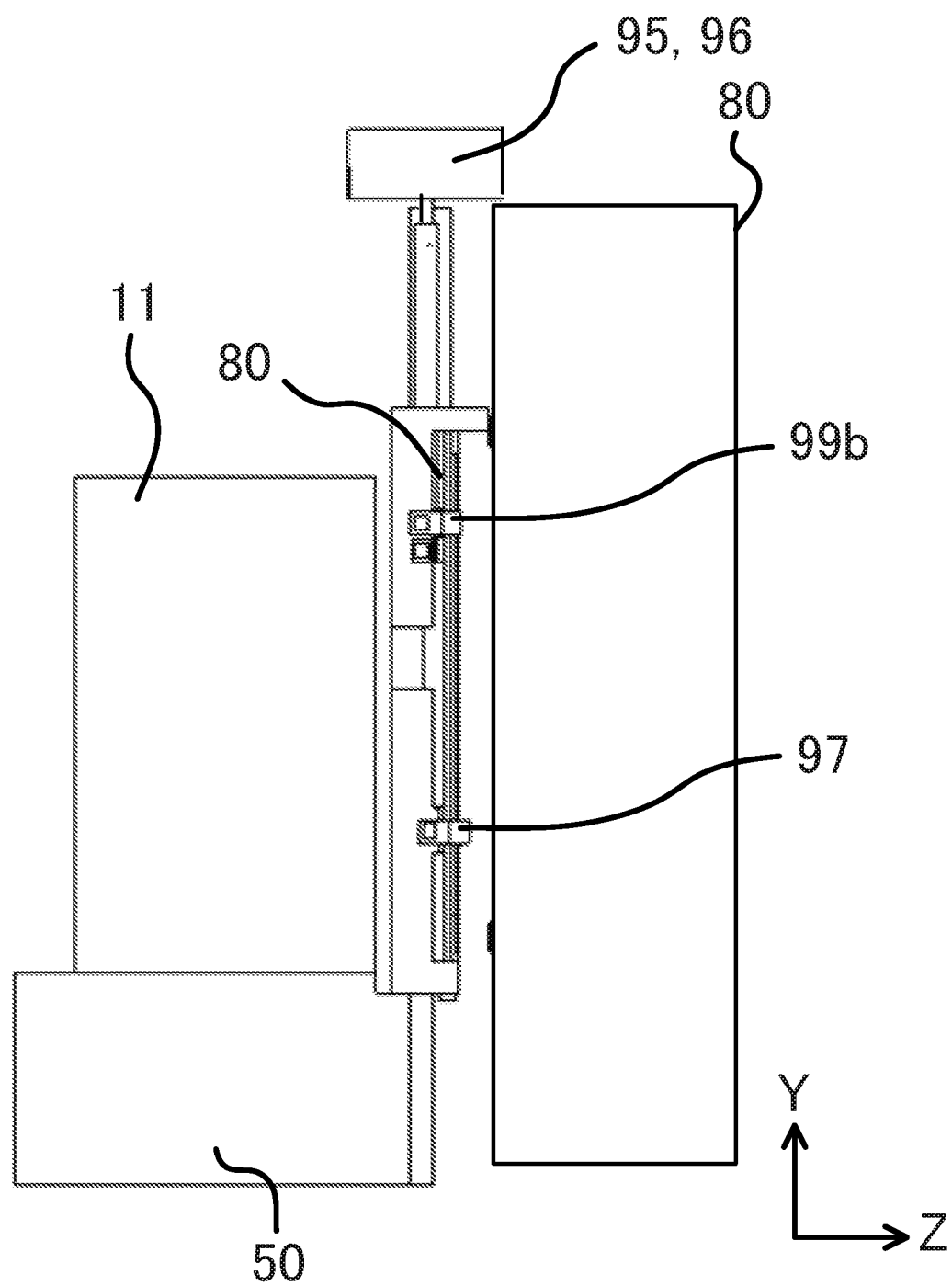
FIG. 4 is a schematic view illustrating an arrangement example of the angle adjustment mechanism according to the first embodiment.

Consequently, the shaft parts 93a and 94a of the cylindrical cams 93 and 94 are arranged at a position (in a surface parallel to a light entrance surface of the optical functional member) perpendicular to the optical axis. Thereby, as illustrated in FIG. 4, the actuators 95 and 96 can be arranged not to be overlapped with the polarization beam splitter (prism) 11 and a panel unit 80 viewed from an optical axis direction (Z-axis direction). Thus, a distance between the polarization beam splitter 11 and the panel unit 80 can be narrowed.

Arranging the actuators 95 and 96 to face a fixing surface of the polarization beam splitter 11 and the optical base 50 in the optical axis can enlarge a space to arrange the actuators. In this case, this enables a gear ratio to be increased and is effective to reduce adjustment sensitivity to a displacement of the actuators.

Next, behavior of the tilting member 91 according to this embodiment will be explained.

Power of the actuator 95 connected to the shaft part 93a rotates the cylindrical cam 93 around a central axis of the shaft 93a. Rotation of the cylindrical cam 93 applies driving force in the optical axis direction (Z-axis direction) being a radial direction of a rotational axis of the cylindrical cam 93 to the tilting member 91. Thereby, the convex spherical surface 91b slides on the concave spherical surface 92b to tilt around an axis in the Y-axis direction passing through a center (center of curvature of a spherical surface) of the convex spherical surface 91b. Accordingly, the cylindrical axis 91a moves in the Z-axis direction while restricting a displacement in the X-axis direction by the U-groove 92a. In other words, the tilting member 91 tilts in only a direction of an arrow A of FIGS. 3 and 5 with the center of the convex spherical surface 91b as a fulcrum.

Power of the actuator 96 connected to the shaft part 94a rotates the cylindrical cam 94 around a central axis of the shaft part 94a. Rotation of the cylindrical cam 94 applies driving force in the optical axis direction (Z-axis direction) being a radial direction of a rotational axis of the cylindrical cam 94 to the tilting member 91. Thereby, the convex spherical surface 91b slides on the concave spherical surface 92b to tilt around an axis in the X-axis direction passing through the center of the convex spherical surface 91b. Accordingly, the cylindrical axis 91a rotates around the central axis while restricting a displacement in the X-axis direction by the U-groove 92a. In other words, the tilting member 91 tilts in only a direction of an arrow B of FIGS. 3 and 6 with the center of the convex spherical surface 91b as a fulcrum.

As above, sliding the concave spherical surface 91b formed on the tilting member 91 on the concave spherical surface 92b allows a tilt around orthogonal two axes using one tilt member, enabling the angle adjustment mechanism to be downsized. Further, rotation restriction by the cylindrical axis 91a and the U-groove 92a can suppress a generation of crosstalk and rotation, and thus can reduce complicatedness of angle adjustment.

In this embodiment, the convex spherical surface formed on the tilting member 91 comes contact with the concave spherical surface formed on the fixing member 92, but the fixing member 92 and the tilting member 91 may respectively include the convex spherical surface and the concave spherical surface. Further, forming tetrahedral groove having three slopes contacting with the convex spherical surface or a conical shape connecting the convex spherical surface instead of the concave spherical surface provide the same effect.

Furthermore, when the optical functional member has a sensitive variation of optical performance to rotation like a wavelength plate and a phase difference compensation plate, urging the cylindrical axis 91a may be urged to the U-groove 92a along one direction using an urging member such as a spring. When the urging member such as the spring urges the cylindrical axis 91a along one direction, the cylindrical axis 91a may be urged to a just plane instead of the U-groove 92a along one direction. Besides, the cylindrical cam may be arranged to restrict rotation. In this case, the cylindrical axis and the U-groove can be omitted.

As described above, the actuators drive the cylindrical cam (displacement transmitter) and using a self-lock of the warm gear maintains an angle. However, during assembly, each angle of the optical functional members 16 to 18 attached to the angle adjustment mechanism 90 is adjusted by hand and subsequently the optical functional members 16 to 18 may be fixed to the angle adjustment mechanism 90 with an adhesive. This allows manufacture of an image display apparatus having a compact and simple configuration and capable of accurately performing angle adjustment of an optical functional member.

Second Embodiment

In a second embodiment, a cylindrical cam (displace transmitter) is arranged to act as a rotational restriction member. A configuration of an optical system is identical with that of the first embodiment and thus an explanation thereof is omitted.

Figure 7:
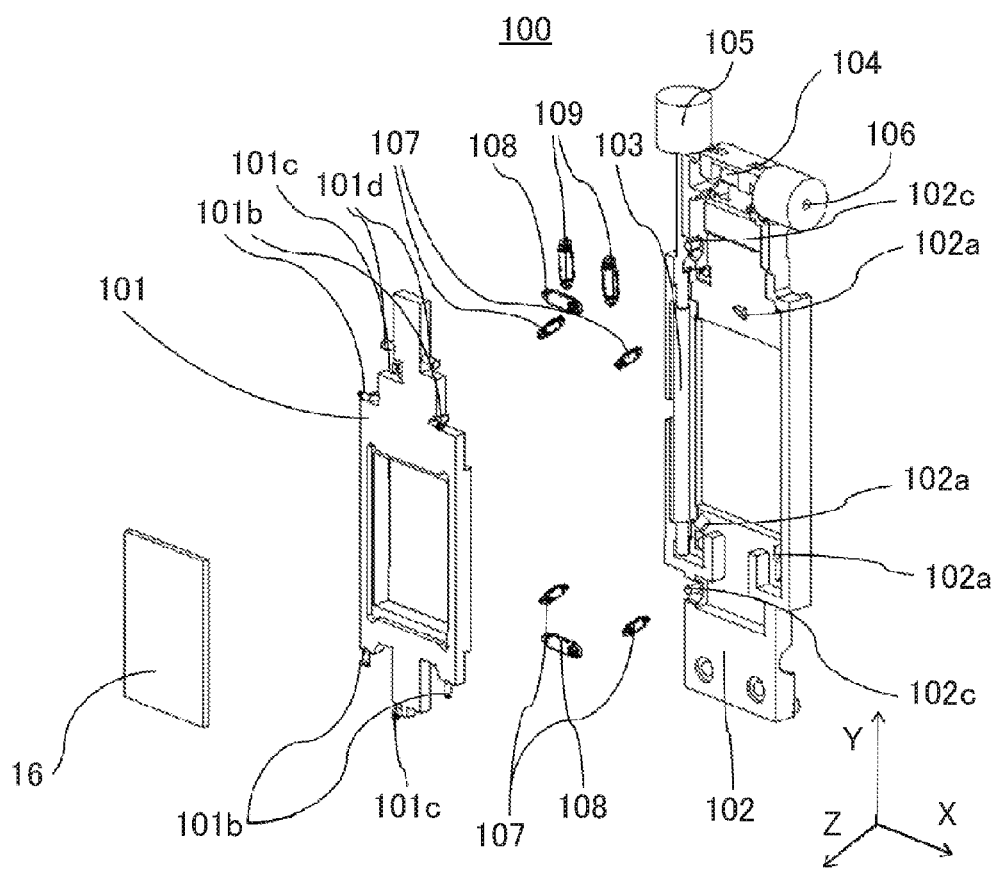
FIG. 7 is an exploded perspective views of an angle adjustment mechanism according to the second embodiment.
Figure 9:
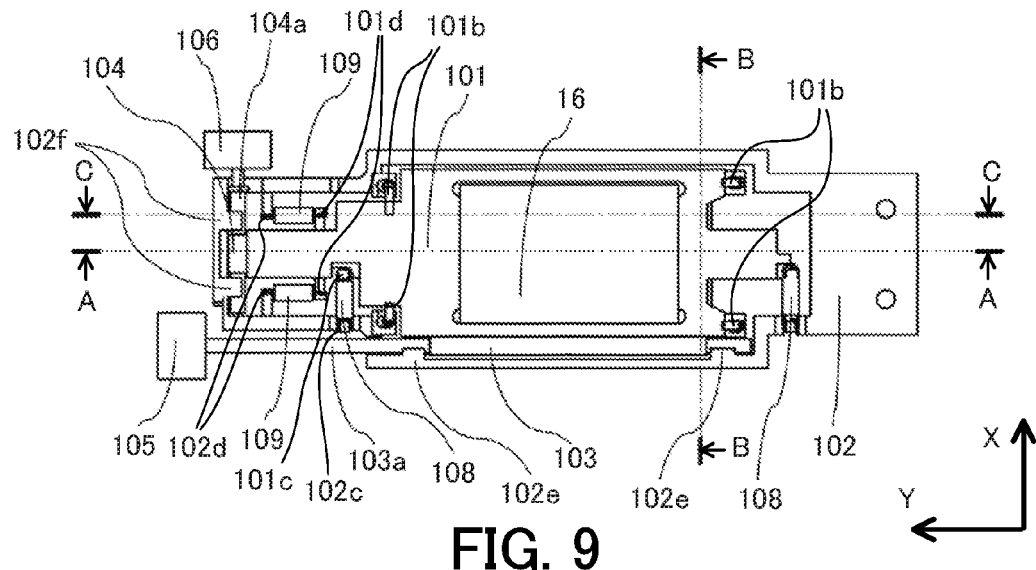
FIG. 9 is an explanatory views of the contact surface of the tilting member and the holder according to the second embodiment.
Figure 10A:
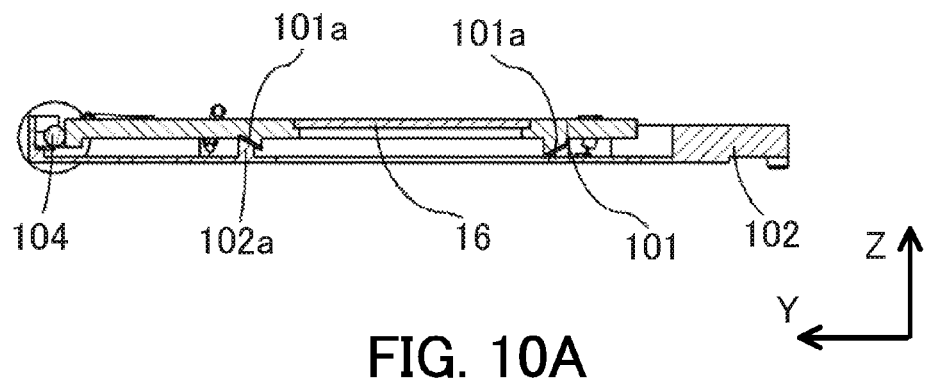
FIGS. 10A and 10B are respectively A-A line and B-B line sectional views of the angle adjustment mechanism according to the second embodiment.
Figure 10B:
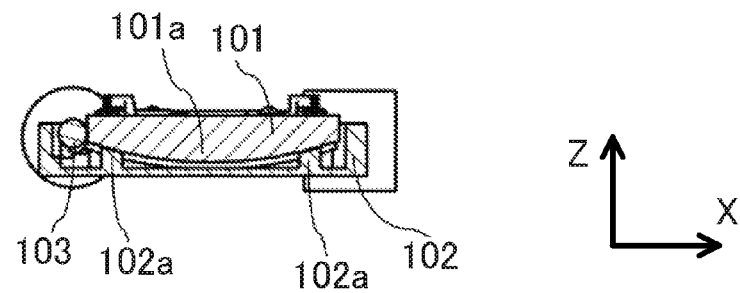
Figure 11:
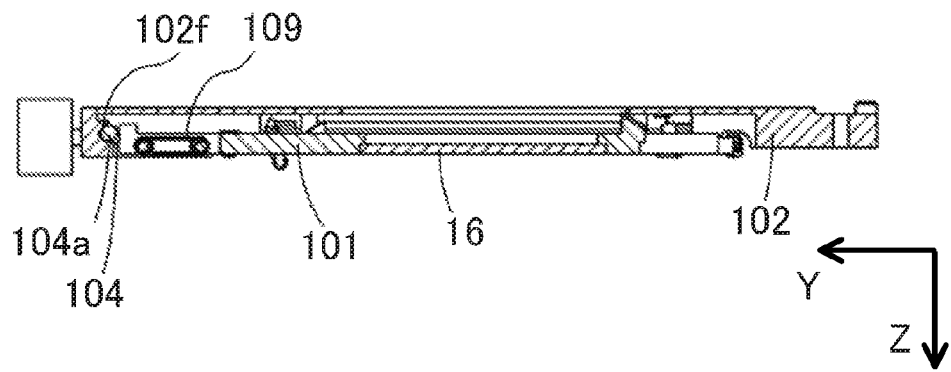
FIG. 11 is a C-C line sectional view of the angle adjustment mechanism according to the second embodiment.

FIG. 7 illustrates an angle adjustment mechanism 100 according to the second embodiment before assembly, and FIG. 9 illustrates the angle adjustment mechanism 100 after assembly. FIG. 10A is an A-A line sectional view of FIG. 9 viewed along the X-axis direction, and FIG. 10B is a B-B line sectional view of FIG. 9 viewed along the Y-axis direction. FIG. 11 is a C-C line sectional view of FIG. 9 viewed along the -X-axis direction.

The angle adjustment mechanism 100 according to this embodiment illustrated in FIG. 7 includes a fixing member 102 fixed by, for example, an optical base 50 in a projector (not illustrated) and a tilting member 101 that holds a glass plate (optical functional member) 16 and contacts with the fixing member 102. The angle adjustment mechanism 100 also includes cylindrical cams 103 and 104 that are attached to the fixing member 102 and respectively displace the tilting member 101 in the X-axis direction and the −Y-axis direction.

The angle adjustment mechanism 100 further includes a spring property member 107 that urges the tilting member 101 to the fixing member 102 and a spring property member 108 that urges the cylindrical member 103 to the fixing member with urging the tilting member 101 to the cylindrical cam 103. A first end and a second end of the spring property member 107 are respectively hooked on a protruding part 101b of the tilting member 101 and a protrusion (not illustrated) of the fixing member 102. A first end and a second end of the spring property member 108 are respectively hooked on a protruding part 101c of the tilting member 101 and a protruding part 102c of the fixing member 102.

The angle adjustment mechanism 100 still further includes a spring property member 109 that urges the cylindrical cam 104 to the fixing member with urging the tilting member 101 to the cylindrical cam 104. A first end and a second end of the spring property member 109 are respectively hooked on a protruding part 101d of the tilting member 101 and a protruding part 102d of the fixing member 102.

Additionally, the angle adjustment mechanism 100 includes actuators 105 and 106 that are attached to the fixing member 102 to respectively apply driving force to the cylindrical cams 103 and 104. These actuators 105 and 106 each include a motor and at least one gear having a worm gear, which are not illustrated.

Figure 8A:
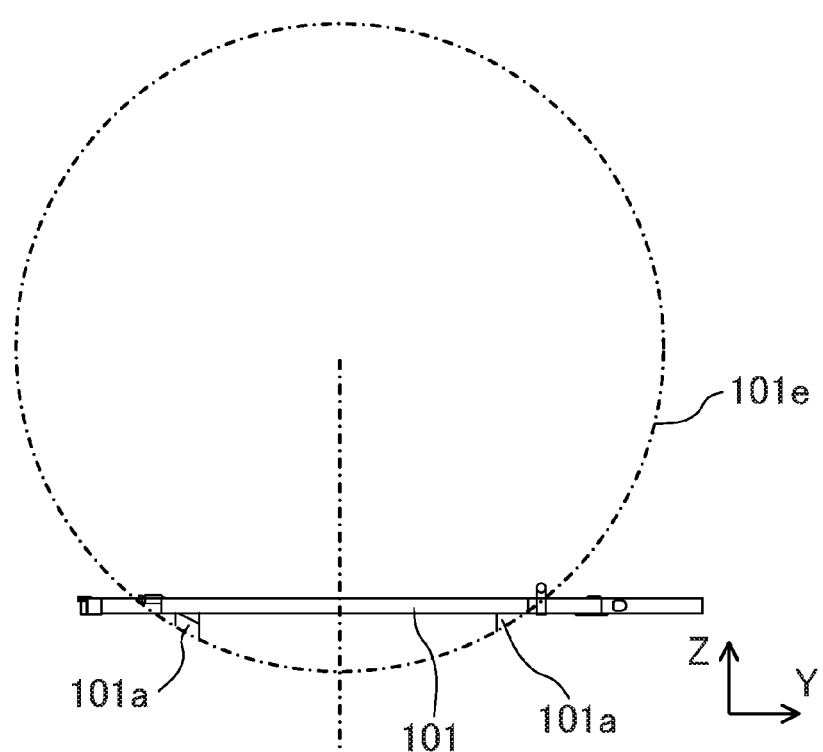
FIGS. 8A and 8B are explanatory views of a contact surface of a tilting member and a holder according to the second embodiment.
Figure 8B:
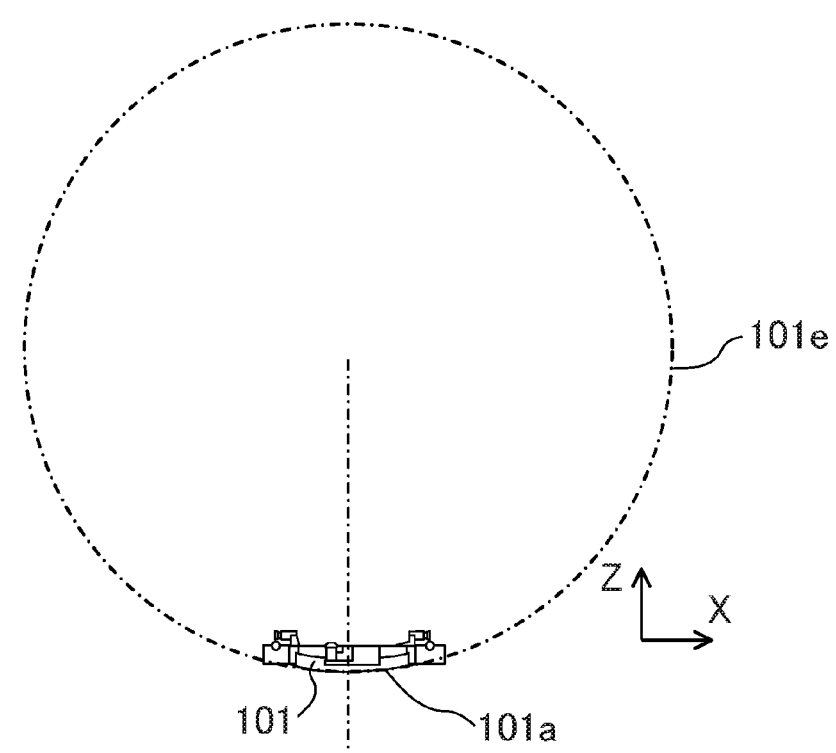

In this embodiment, as illustrated in FIGS. 8A and 8B, the tilting member 101 includes spherical surfaces 101a that contacts with a virtual spherical surface 101e having a center of curvature on a normal passing through a center of an entrance surface of the glass plate 16. Meanwhile, the fixing member 102 is provided with three slopes 102a respectively having a shape (complementary shape) corresponding to each of the spherical surfaces 101a. As illustrated in FIGS. 10A and 10B, after assembly, the tilting member 101 is arranged with respect to the fixing member 102 so that each of the spherical surfaces 101a contacts with each of the slopes 102a. Thereby, the fixing member 102 tiltably supports the tilting member 101 in an arbitrary direction along the spherical surfaces 101a.

As illustrated in FIG. 11, the spring property member 109 urges the tilting member 101 in the Y-axis direction to abut against the cylindrical cam 104. The spring property member 109 urges a shaft part 104a of the cylindrical cam 104 through the tilting member 101 to abut against a V-groove 102f formed on the fixing member 102. This configuration enables the fixing member 102 to rotatably support the cylindrical cam 104 around the X-axis.

In addition, the spring property member 108 urges the tilting member 101 in the X-axis direction to abut against the cylindrical cam 103 as the tilting member 101 abuts against the cylindrical cam 104. The spring property member 108 urges a shaft part 103a of the cylindrical cam 103 through the tilting member 101 to abut against a V-groove 102e. This configuration enables the fixing member 102 to rotatably support the cylindrical cam 103 around the Y-axis.

Figure 12A:
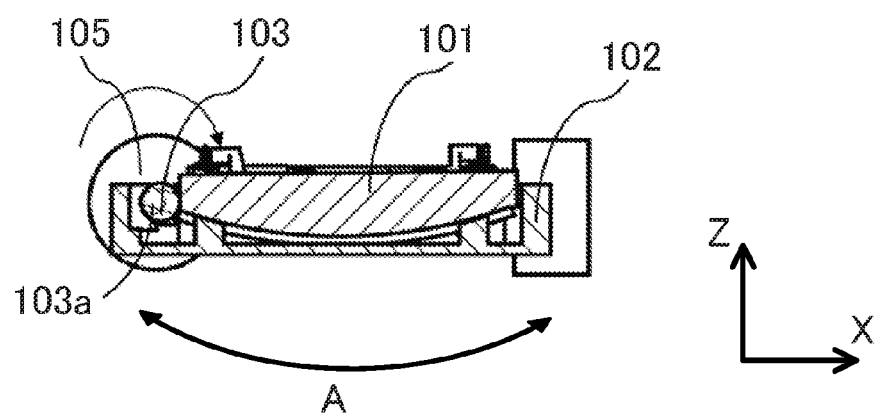
FIGS. 12A and 12B are explanatory views of atilt of the tilting member according to the second embodiment.
Figure 12B:
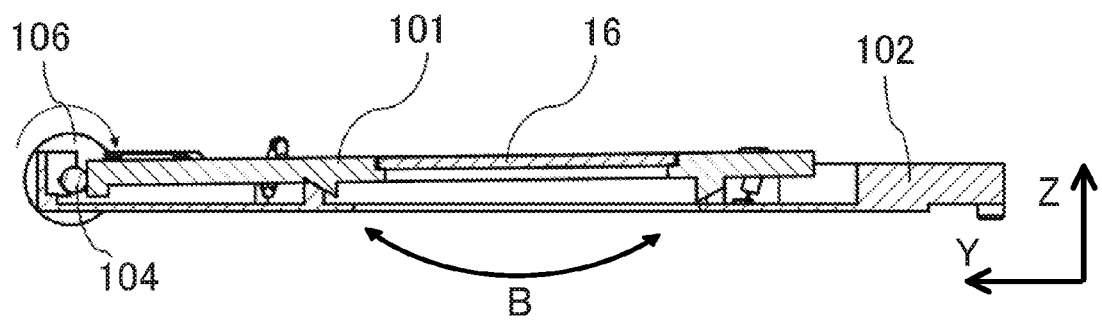

Next, behavior of the tilting member 101 according to this embodiment will be explained as referring to FIGS. 12A and 12B.

Power of the actuator 105 connected to the shaft part 103a rotates the cylindrical cam 103 around a central axis of the shaft 103a. Rotation of the cylindrical cam 103 applies driving force in the X-axis direction being a radial direction of the cylindrical cam 103 to the tilting member 101 so that the spherical surfaces 101a slide on the slopes 102a. Simultaneously, the cylindrical cam 104 serves as a guide to restrict a displacement in the Y-axis direction of the tilting member 101. As a result, the tilting member 101 tilts along the spherical surface 101a around only an axis that is parallel to the Y-axis and passes through the center of curvature of the virtual spherical surface 101e. In other words, rotation of the cylindrical cam 103 tilts the tilting member 101 in only a direction of an arrow A of FIG. 12A.

When the cylindrical cam 103 is driven, a tilt of the tilting member 101 slightly moves a contact part between the tilting member 101 and the cylindrical cam 104 along a cylindrical shape of the cylindrical cam 104. Accordingly, the tilting member 101 is slightly displaced in the Y-axis direction. However, since the slopes 102a of the fixing member 102 converts a displacement of the tilting member 101 in the Y-axis direction into a tilt, crosstalk is practically not a problem. Specifically, when an angle of the slopes 102a and an eccentricity quantity of a cam is set so that the tilting member tilts by 1.0 [deg] with the rotation of the cylindrical cam 103 by 180 [deg], a maximum value of crosstalk by a variation of a contact point is 0.0055 [deg] and is sufficiently small.

Power of the actuator 106 connected to the shaft part 104a rotates the cylindrical cam 104 around the central axis of the shaft part 104a. Rotation of the cylindrical cam 104 applies driving force in the Y-axis direction being a radial direction of the cylindrical cam 104 to the tilting member 101 so that the spherical surface 101a slides on the slopes 102a. Simultaneously, the cylindrical cam 103 serves as a guide to restrict a displacement in the X-axis direction of the tilting member 101. As a result, the tilting member 101 tilts along the spherical surface 101a around only an axis that is parallel to the X-axis and passes through the center of curvature of the virtual spherical surface 101e. In other words, rotation of the cylindrical cam 104 tilts the tilting member 101 in only a direction of an arrow B of FIG. 12B.

When the cylindrical cam 104 is driven, a tilt of the tilting member 101 slightly moves a contact part between the tilting member 101 and the cylindrical cam 103 along a cylindrical shape of the cylindrical cam 103. Accordingly, the tilting member 101 is slightly displaced in the X-axis direction. However, since the slopes 102a of the fixing member 102 converts a displacement of the tilting member 101 in the X-axis direction into a tilt as with drive of the cylindrical cam 103, crosstalk is practically not a problem.

Moreover, when the tilting member 101 is driven in the X-axis direction or the Y-axis direction, lengthening a length in a thrust direction of the cylindrical cams 103 and 104 serving as a guide suppresses rotation more effectively. A plurality of panels are frequently adjacent in a short side direction of a panel display region near a panel, and thus a space constraint in the short-side direction of the panel display region is larger than a space constraint in the long-side direction of the panel display region. Accordingly, the length in the thrust direction, which has a comparatively small space constraint, of the cylindrical cam 103 extended in the Y-axis direction should be larger than that of the cylindrical cam 104.

Thus, sliding the spherical surface 101a formed on the tilting member 101 on the slopes 102a enables one tilting member 101 to tilt around orthogonal two axes. Further, when one of the cylindrical cams 103 and 104 is driven, the other is served as a guide to restrict the tilt of the tilting member 101. Accordingly, a structure for a guide is not required, and thus the angle adjustment mechanism 100 can be further downsized.

In this embodiment, the spherical surfaces formed on the tilting member 101 each contact with each slope of the fixing member 102, but the fixing member 102 and the tilting member 101 may respectively include spherical surfaces and slopes. Furthermore, the configuration that a convex spherical surface contacts with a concave spherical surface may be used.

Further, when a radius of a spherical surface is sufficiently larger than a moving quantity in the X-axis and Y-axis directions of the tilting member 101, forming at least three slopes that connects with a spherical surface instead of a spherical surface can obtain a tilt approximately equivalent to the tilt of the configuration according to this embodiment.

Third Embodiment

In a third embodiment, a configuration that the angle adjustment mechanism 90 explained in the first embodiment is further provided with a mechanism adjusting an angle around an optical axis will be explained.

an explanation of the same configuration as the first embodiment is omitted.

In this embodiment, an optical functional member is a wavelength plate and an angle adjustment mechanism 90 functions as a registration adjustment mechanism. At the same time, rotating the wavelength plate around an axis perpendicular to the optical axis can also adjust a height of contrast. In this embodiment, the angle adjustment mechanism 90 is provided with the mechanism adjusting an angle around the optical axis as follows.

Figure 13:
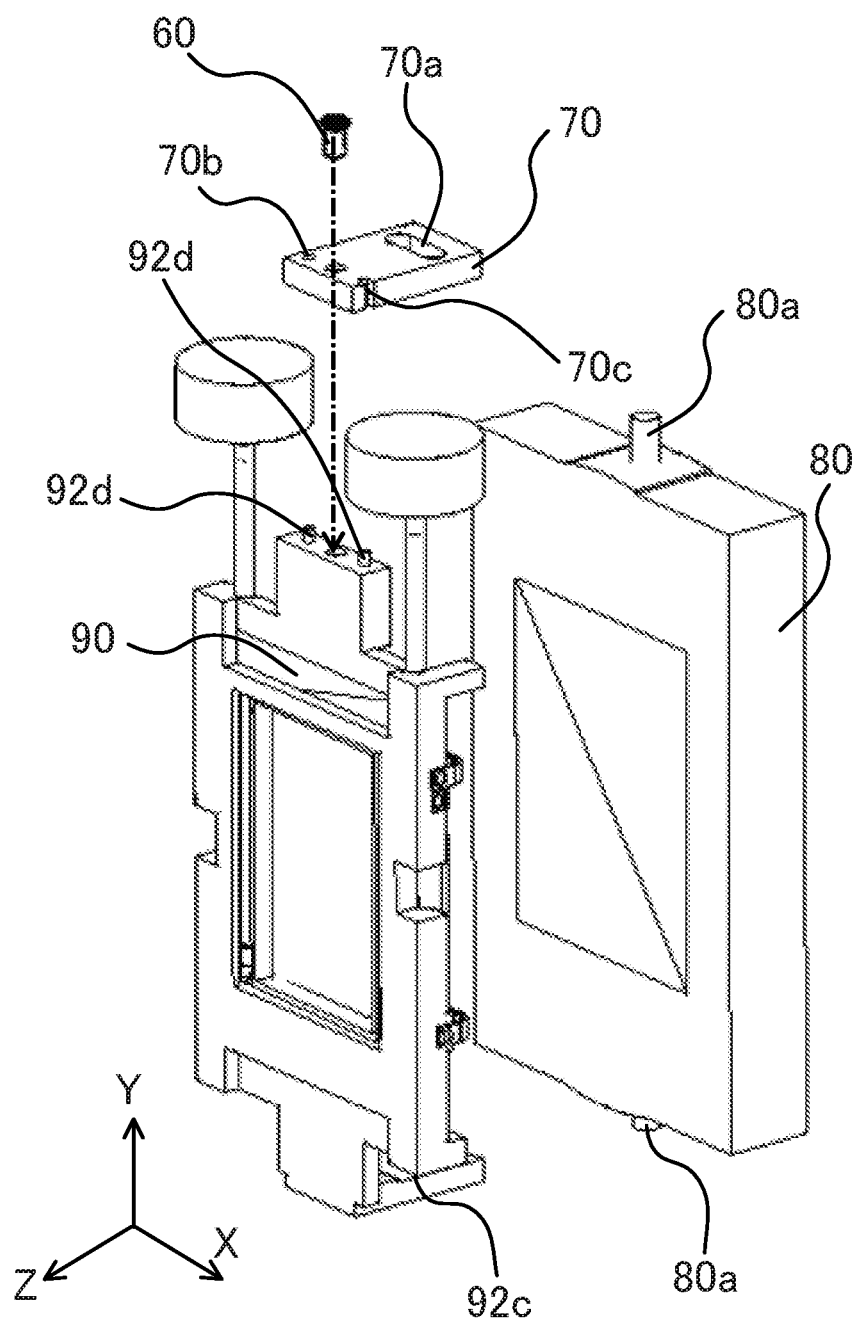
FIG. 13 is an exploded perspective view of an angle adjustment mechanism and a panel unit according to the third embodiment.

The optical adjustment mechanism 90 is attached to a panel unit 80 as illustrated in FIG. 13. Specifically, a protrusion 80a provided on the panel unit 80 is inserted into a long hole 92c formed on a fixing member 92 of the angle adjustment mechanism 90 to extend in the X-axis direction. In this state, the protrusion 80a of the panel unit 80 is also inserted into along hole 70a of a temporary joint member 70, and two protrusions 92d of the fixing member are respectively inserted into a positioning hole 70b and a rotation preventing hole 70c of the temporary joint member 70.

Further, the temporary joint member 70 is fixed to the fixing member 92 with a screw 60. The hole diameter of the long hole 70a is formed larger than the outer diameter of the protrusion 80a not to be double fitted.

Figure 14A:
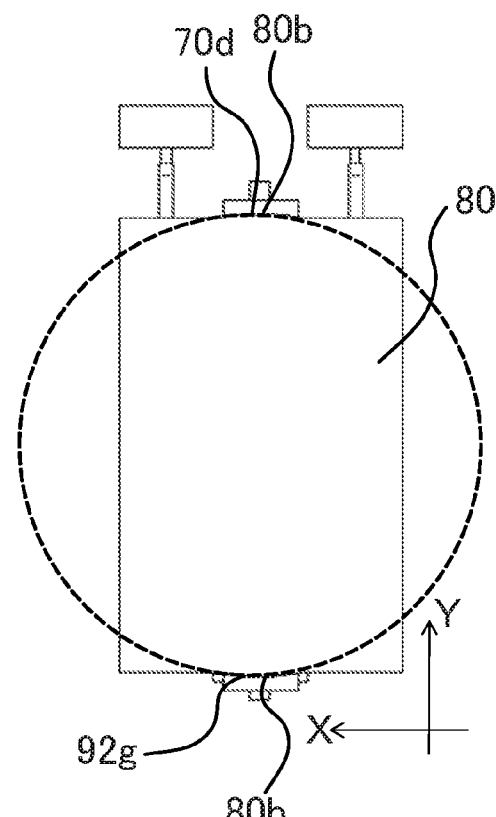
FIGS. 14A and 14B are explanatory views of rotation around an optical axis of the angle adjustment mechanism according to the third embodiment.
Figure 14B:
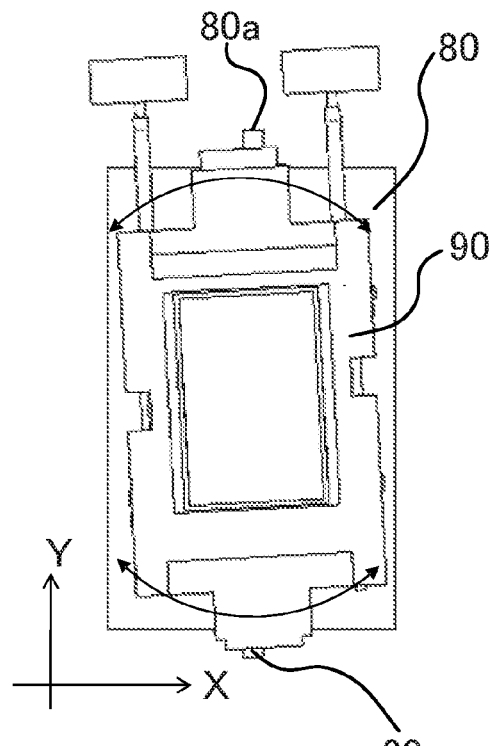

Besides, as illustrated in FIGS. 14A and 14B, the temporary joint member 70, the panel unit 80 and the fixing member 92 are respectively provided with rotational sliders 70d, 80b and 92g that are an arc shape sliding around an axis passing through a canter of the optical axis.

In this state, moving the protrusion 80a in the long hole 92c of the fixing member 92 and the long hole 70a of the temporary joint member slides the rotational sliders 70b and 92g in an arc shape relative to the rotational slider 80b and rotates the fixing member 92 around the optical axis. With rotation of the fixing member 92, the whole angle adjustment mechanism 90 rotates.

The above configuration enables the wavelength plate held by the angle adjustment mechanism 90 to adjust contrast. After completing adjustment of the fixing member 92 around the optical axis, applying an adhesive to the long hole 92c can fix an angle of the angle adjustment mechanism 90 around the optical axis with respect to the panel unit 80. After fixing the angle around the optical axis, when the angle adjustment mechanism 90 performs registration adjustment, restricting action of the angle adjustment mechanism 90 explained in the first embodiment suppresses its rotation around the optical axis and thus can control reduction of contrast. Accordingly, both registration adjustment and contrast adjustment using one angle adjustment mechanism can be performed, and thus space efficiency can increase.

In this embodiment, the angle adjustment mechanism 90 is attached to the panel unit 80, but the optical base 50 may be provided with the protrusions 80a and 80b and the angle adjustment mechanism 90 may rotate around the optical axis relative to the optical base.

Additionally, in this embodiment, the angle adjustment mechanism 90 according to the first embodiment is used, but the angle adjustment mechanism 100 according to the second embodiment may be used.

In the first to third embodiments, the actuators drive the cylindrical cam (displacement transmitter) and using the self-lock of the worm gear maintain an angle, but the angle adjustment mechanism may be fixed by, for example, an adhesive after adjusting an angle by hand during assembly.

Fourth Embodiment

In a four embodiment, the angle adjustment mechanism 90 according to the first embodiment is used as an optical registration adjustment mechanism, and is controlled in conjunction with electrical registration adjustment controlling a panel using an electric signal.

In the registration adjustment using a transparent plate member, when t is a thickness of the transparent plate member, n is a refractive index and $\theta$ is a tilting quantity, a shift quantity $\delta$ of light is represented by the following expression.

$$\delta \approx (1 - 1/n) \times t \times \theta \times \pi / 180$$

Thus, reducing an adjustment range of the angle adjustment mechanism 90 can decrease the thickness t and the tilting quantity $\theta$, and can arrange the angle adjustment mechanism 90 in a small space. Accordingly, the adjustment range of the angle adjustment mechanism 90 is set to ±0.5 pixel.

Figure 15:
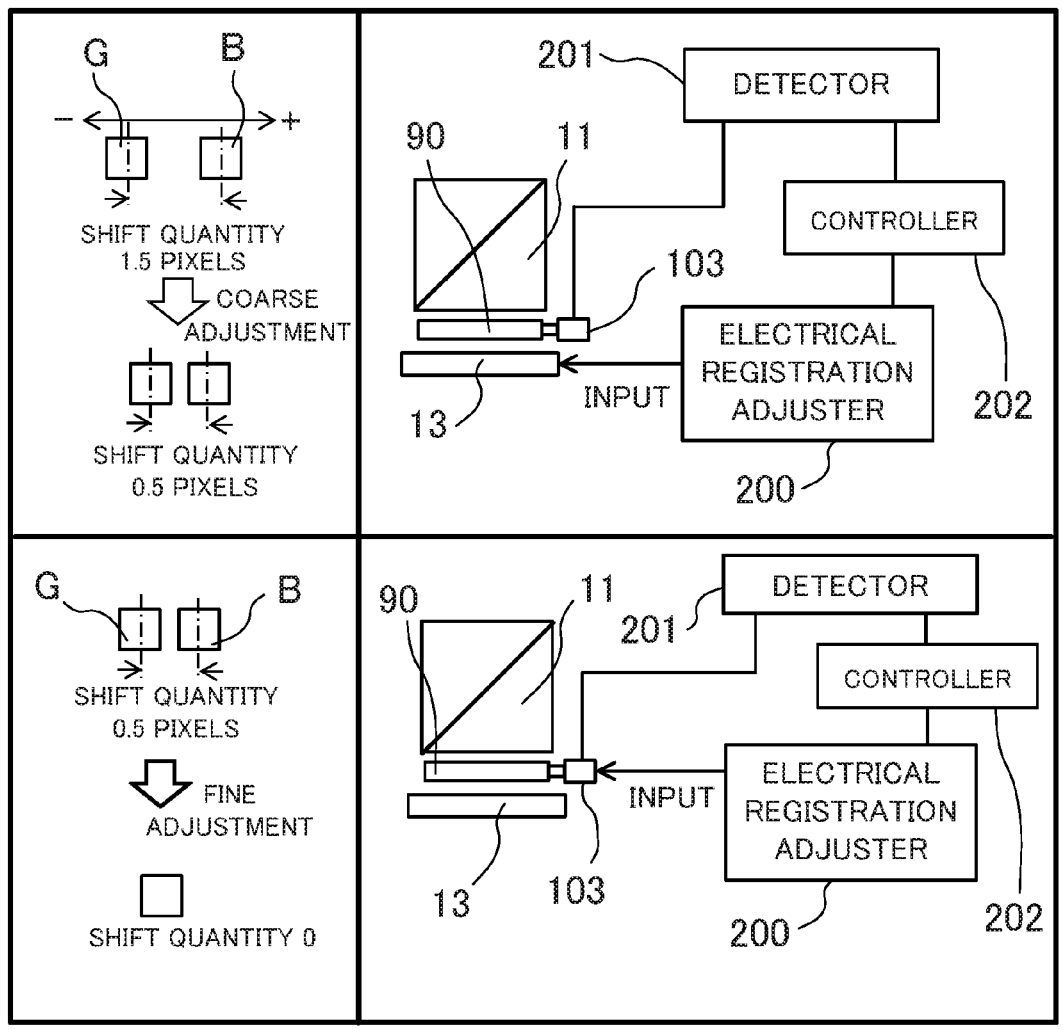
FIG. 15 is an explanatory view of registration adjustment according to the fourth embodiment.

Furthermore, actuators 95 and 96 of the angle adjustment mechanism 90 are gear unit including a stepping motor and a worm gear. In this embodiment, a projection display apparatus (projector) 300 includes an electrical registration adjuster 200 that shifts a display pixel by one pixel using signal processing to perform registration adjustment in one pixel unit. Accordingly, users properly use fine adjustment smaller than one pixel using the angle adjustment mechanism 90 and coarse adjustment in one pixel unit using the electrical registration adjuster 200, and thus perform adjustment smaller than one pixel over ±1 pixel or more. For example, when an image shift quantity is 1.5 pixels as illustrated in FIG. 15, users firstly perform adjustment of one pixel using the electrical registration adjuster 200 as coarse adjustment. Subsequently, performing adjustment by 0.5 pixels using the angle adjustment mechanism 90 as fine adjustment can perform adjustment smaller than one pixel, which is the adjustment range of registration adjustment using the electrical registration adjuster 200.

Figure 16:
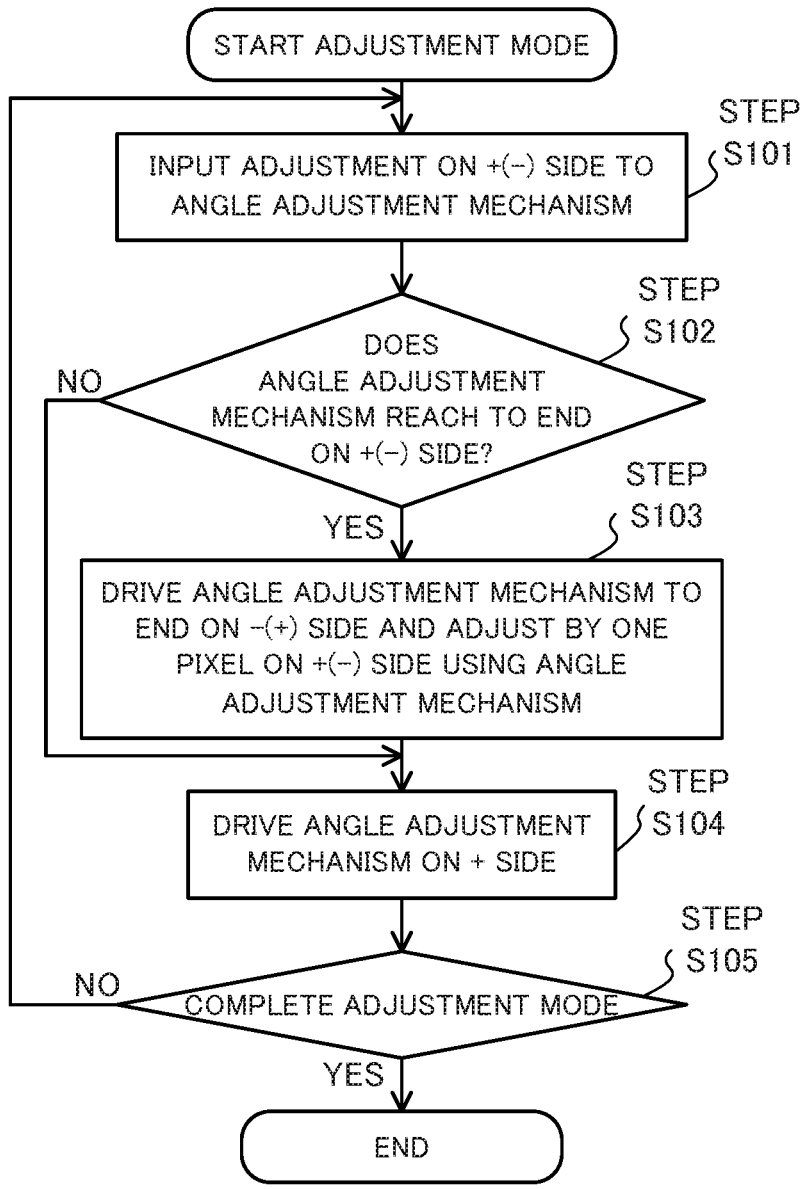
FIG. 16 is a flowchart of the registration adjustment according to the fourth embodiment.

Moreover, in this embodiment, when the angle adjustment mechanism 90 reaches an adjustment end of the angle adjustment mechanism 90 while users perform fine adjustment using the angle adjustment mechanism 90, a detector 201 that counts a pulse of the stepping motors of the actuators 95 and 96 performs end detection to properly perform registration adjustment. In this embodiment, the following control based on the detection by the detector 201 is performed according to a flowchart of FIG. 16. Hereinafter, only driving the stepping motor of the actuator 95 is explained to simplify an explanation.

At step S101, a controller 202 performs a drive input for adjustment to a +(−) side to the stepping motor of the actuator 95 of the angle adjustment mechanism 90 in accordance with an instruction by users.

At step S102, the controller 202 determines whether or not the detector 201 detects an arrival to the adjustment end (limit position of a tilt) on the +(−) side of the angle adjustment mechanism 90. If the controller 202 detects an arrive to the +(−) adjustment end, the flow advances to step S103, otherwise advances to step S105.

At step S103, the controller 202 drives the angle adjustment mechanism 90 to an adjustment end on −(+) side, which is opposite to the adjustment end detected at the step S102. In other words, the actuator 95 is inputted to a signal for driving in an opposite direction of the driving direction at the step S101. Coinstantaneously, the controller 202 inputs a signal for driving to perform adjustment by one pixel to the +(−) side in an opposite direction of a direction of adjustment using the angle adjustment mechanism 90 to the electrical registration adjuster 200. In other words, since driving the angle adjustment mechanism 90 performs adjustment by −1 pixel and the electrical registration adjuster 200 performs adjustment by +1 pixel, registration on a projection screen is maintained without varying in control at the step S103. However, the angle adjustment mechanism 90 is driven to the adjustment end on the −(+) end and thus can perform adjustment to the +(−) side by driving in the same direction as the driving direction at the step S101.

At step S104, the controller 202 performs a drive input for adjustment to the +(−) side to drive in the same direction as the driving direction at the step S101 to the stepping motor of the actuator 95 of the angle adjustment mechanism 90.

At step S105, the controller 202 determines whether or not adjustment ends, and if adjustment ends, completes processing, otherwise returns processing to the step S101.

As described above, the controller 202 controls the angle adjustment mechanism 90 and the electrical registration adjuster 200, enabling the adjustment smaller than one pixel over ±1 pixel even if the adjustment range of the angle adjustment mechanism 90 is reduced.

For example, when the adjustment range of the electrical registration adjuster 200 is ±3 pixels, adjustment of a unit smaller than one pixel over ±3 pixels can be performed.

In this embodiment, the adjustment range of the angle adjustment mechanism 90 is set to ±0.5 pixel, but may be set to an arbitrary value larger than 0.5 pixel. Additionally, end detection is performed by a detector that counts a pulse of a stepping motor, but may be performed using various detecting methods such as a method combining a DC motor and an encoder, and a method using an angle sensor attached to a tilting member. In addition, the angle adjustment mechanism reached to the adjustment end is automatically controlled by the controller 202, but may be performed by an input of an user. In this case, the detector 201 is not required.

In this embodiment, the angle adjustment mechanism according to this embodiment is arranged in three optical paths, any two optical paths, or one optical path of R, G and B light, and is preferably arranged in the optical path of G light when arranging in one optical path. This is because the R and B panels are fixed to the polarization beam splitter 12 but the G panel is fixed to the polarization beam splitter 11, and thus a registration shift between the B and R panels relatively easily occurs relative to a registration shift between the R(B) and G panel.

Furthermore, the angle adjustment mechanism 90 according to the first embodiment is used in this embodiment, but the angle adjustment mechanism according to the second and third embodiments may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-141792, filed on Jul. 16, 2015, which is hereby incorporated by reference herein in its entirety.

What is claimed is:

1. An angle adjustment apparatus that adjusts an angle of an optical member, the angle adjustment apparatus comprising:
   a holder that includes a first surface and holds the optical member;
   a base member that includes a second surface coming into contact with the first surface and supports the holder;
   an urging member that urges the holder to the base member; and
   a driver that applies driving force to the holder,
   wherein the driver applies driving force to the holder in a direction perpendicular to a first direction when driving the holder around the first direction, and applies driving force to the holder in a direction different from the first direction and perpendicular to a second direction perpendicular to the first direction when driving the holder around the second direction, and
   wherein at least one surface of the first and second surfaces includes a curved shape that enables the holder to tilt relative to the base member around the first and the second directions.

2. The angle adjustment apparatus according to claim 1, wherein the driver includes a displacement transmitter that has a rotational axis extending in a plane parallel to a light entrance surface of the optical member, and wherein the displacement transmitter has a shape that comes into connect with the holder in a radial direction of the rotational axis and rotates around the rotational axis to apply the driving force to the holder.

3. The angle adjustment apparatus according to claim 2, wherein the displacement transmitter has a cylindrical shape, and
wherein the rotational axis is decentered from a central axis of the cylindrical shape.

4. The angle adjustment apparatus according to claim 2, wherein the driver includes a first displacement transmitter and a second displacement transmitter that function as the displacement transmitter and respectively have a first rotational axis and a second rotational axis orthogonal to each other, and
wherein rotating the first displacement transmitter to apply the driving force to the holder allows the second displacement transmitter to restrict driving of the holder in a radial direction of the second rotational axis of the second displacement transmitter.

5. The angle adjustment apparatus according to claim 2, wherein the driver includes an actuator that rotates the displacement transmitter around the rotational axis, and
wherein the actuator is arranged not to be overlapped with the holder when viewed from a direction perpendicular to a light entrance surface of the optical member.

6. The angle adjustment apparatus according to claim 1, wherein the curved shape is a spherical surface.

7. The angle adjustment apparatus according to claim 1, wherein the first and second surfaces are curved surfaces having complementary shapes.

8. The angle adjustment apparatus according to claim 1, wherein the first surface is slidable around orthogonal two axes that passes through a center of curvature of the curved shape with respect to the second surface according to a position where the driving force is applied to the holder.

9. The angle adjustment apparatus according to claim 1, further comprising a rotating member that rotates the base member in a surface parallel to a light entrance surface of the optical member.

10. The angle adjustment apparatus according to claim 1, wherein when L1 is a width in the first direction of the holder, a distance between both ends in the first direction of one or more parts of the holder that contacts with the driver is 30% to 70% of the width L1.

11. The angle adjustment apparatus according to claim 1, wherein when L2 is a width in the second direction of the holder, a distance between both ends in the second direction of one or more parts of the holder that contacts with the driver is 30% to 70% of the width L2.

12. The angle adjustment apparatus according to claim 1, wherein when L1 is a width in the first direction of the holder, a length of a part of the holder that contacts with the driver while the driver applies driving force in the second direction to the holder is 30% to 70% of the width L1.

13. The angle adjustment apparatus according to claim 1, wherein when L2 is a width in the second direction of the holder, a length of a part of the holder that contacts with the driver while the driver applies driving force in the first direction to the holder is 30% to 70% of the width L2.

14. A production method of an image display apparatus including an image display element and a illumination optical system that has an optical member and guides light from a light source to the image display element, the method comprising:
a step of attaching the optical member to an angle adjustment apparatus that adjusts an angle of the optical member; and
a step of adjusting an angle of the attached optical member using the angle optical apparatus,
wherein the angle adjustment apparatus comprises:
a holder that includes a first surface and holds the optical member;
a base member that includes a second surface coming into contact with the first surface and supports the holder;
an urging member that urges the holder to the base member; and
a driver that applies driving force to the holder,
wherein the driver applies driving force to the holder in a direction perpendicular to a first direction when driving the holder around the first direction, and applies driving force to the holder in a direction different from the first direction and perpendicular to a second direction perpendicular to the first direction when driving the holder around the second direction, and
wherein at least one surface of the first and second surfaces includes a curved shape that enables the holder to tilt relative to the base member around the first and the second directions.

15. An image display apparatus comprising:
a liquid crystal panel that modulates light from a light source;
an optical system that guides light from the light source to the liquid crystal panel;
an optical member that is arranged between the liquid crystal panel and the optical system; and
an angle adjuster that adjusts an angle of the optical member,
wherein the angle adjuster has a holder that includes a first surface and holds the optical member, a base member that includes a second surface coming into contact with the first surface and supports the holder, an urging member that urges the holder to the base member, and a driver that applies driving force to the holder,
wherein the driver applies driving force to the holder in a direction perpendicular to a first direction when driving the holder around the first direction, and applies driving force to the holder in a direction different from the first direction and perpendicular to a second direction perpendicular to the first direction when driving the holder around the second direction, and
wherein at least one surface of the first and second surfaces includes a curved shape that enables the holder to tilt relative to the base member around the first and the second directions.

16. The image display apparatus according to claim 15, wherein the liquid crystal panel includes three liquid crystal panels each corresponding to red, green and blue colors, and
wherein the angle adjuster is arranged between each of at least two of the three liquid crystal panels and the optical system, and adjusts an angle of the optical member to optically perform registration.

17. The image display apparatus according to claim 15, further comprising an electrical registration adjuster that adjusts registration in accordance with an electrical signal from the liquid crystal panel.

18. The image display apparatus according to claim 17, further comprising a controller that controls the angle adjuster and the electrical registration adjuster, wherein
wherein the driver of the angle adjuster includes a detector that detects a tilt of the optical member, and wherein when the detector detects that a position of the optical member is a limit position of a tilt in a first direction of the optical member by tilting the optical member in the first direction, the controller controls the electrical registration adjuster to maintain registration while tilting the optical member in a second direction opposite to the first direction and subsequently tilts the optical member in the first direction.

19. The image display apparatus according to claim 15, wherein the optical member is any one of a phase difference compensation film, a glass plate having an antireflection film, a polarization plate, a phase difference plate and a glass plate having a dichroic film.

* * * * *